United States Patent [19]
Long

[11] Patent Number: 5,268,094
[45] Date of Patent: Dec. 7, 1993

[54] WASTEWATER PROCESSING APPARATUS

[76] Inventor: Jeffrey N. Long, Box 17A, Hillsgrove, Pa. 18619

[21] Appl. No.: 748,040

[22] Filed: Aug. 21, 1991

Related U.S. Application Data

[62] Division of Ser. No. 494,674, Mar. 15, 1990, abandoned.

[51] Int. Cl.$^5$ ............................................. C02F 3/30
[52] U.S. Cl. ................................ 210/139; 210/142; 210/195.3; 210/201
[58] Field of Search .............. 210/605, 614, 621–623, 210/626, 628–630, 758, 903, 195.3, 138, 139, 141, 142, 201, 220, 258

[56] References Cited

U.S. PATENT DOCUMENTS

| | | | |
|---|---|---|---|
| 4,183,810 | 1/1980 | Baenens et al. | 210/614 |
| 4,622,134 | 11/1986 | Kobayashi | 210/195.3 |
| 4,655,925 | 4/1987 | Tabata et al. | 210/605 |
| 4,663,044 | 5/1987 | Goronszy | 210/903 |
| 4,793,930 | 12/1988 | Soeder et al. | 210/626 |
| 4,917,805 | 4/1990 | Reid | 210/605 |

Primary Examiner—Thomas Wyse

[57] ABSTRACT

A method is provided in accordance with this invention for treating wastewater in a tank having comminute, mix and settle sections. The method comprises receiving wastewater in the comminute section, comminuting solids in the wastewater, mixing the wastewater with air in the mix section, mixing the wastewater without further addition of air, mixing the wastewater with air again, directing wastewater to the settle section, separating solids from the wastewater, returning the solids to the mix section, and discharging the effluent from the tank. In another aspect, this invention relates to an improved apparatus for carrying out the method of this invention.

7 Claims, 7 Drawing Sheets

NITRIFICATION

DENITRIFICATION

WASTEWATER PROCESSING APPARATUS

This is a divisional of copending application Ser. No. 07/494,674, filed on Mar. 15, 1990, now abandoned.

TECHNICAL FIELD

This invention relates to an improved apparatus and method for treating wastewater such as sewage and, more specifically, to an improved apparatus and method for treating wastewater from a single home or small community sequentially with air and without further addition of air to minimize any ammonia and nitrate in the effluent.

BACKGROUND ART

A number of wastewater treatment systems having a variety of features and using a variety of treatment methods are known in the art including U.S. Pat. Nos. 3,251,471, 3,327,855, 3,476,682, 3,679,053, 3,721,344 and 3,834,536. Many prior art single home or small community wastewater treatment systems are anaerobic units such as septic tanks. Other prior art single home or small community wastewater treatment systems are aerobic units.

One disadvantage of systems using aerobic treatment methods is that effluent therefrom will likely contain substantial amounts of nitrate which can cause algae blooms in receiving water. High concentrations of nitrate in drinking water can also cause methemoglobinemia in infants. *Controlling Wastewater Treatment Processes*, Dan Cortinovis, Ridgeline Press, 1984, p. 15.

One disadvantage of systems using anaerobic treatment methods is that effluent therefrom will likely contain substantial amounts of ammonia created from the decay of proteins and urea in raw sewage. Ammonia in the un-ionized form is toxic to fish and other aquatic life, especially when the receiving water is of a relatively high pH. Further, the ammonia creates an oxygen demand in the receiving water and then, as in aerobic treatment methods, nitrate is produced. In turn, the nitrate may cause algae blooms which increase the pH of the receiving water, making additional ammonia even more toxic. *Controlling,* pp. 13-14. By using a combination of aerobic and anaerobic methods, however, ammonia in the wastewater can be converted to relatively harmless nitrogen. *Controlling,* p. 15.

SUMMARY OF THE INVENTION

Accordingly, it is an object of this invention to provide an improved apparatus and method for treating wastewater from a single house or small community to convert ammonia therein to nitrogen. It is a further object of this invention to provide an improved apparatus and method for mixing wastewater from a single home or small community with air and without further addition of air to convert ammonia therein to nitrogen.

These and other objects are achieved by the provision of a method for treating wastewater in a tank having comminute, mix and settle sections. The method comprises receiving wastewater in the comminute section, comminuting solids in the wastewater, mixing the wastewater with air in the mix section, mixing the wastewater without further addition of air, mixing the wastewater with air again, directing wastewater to the settle section, separating solids from the wastewater, returning the solids to the mix section, and discharging the effluent from the tank.

In one embodiment, the wastewater is treated in sequential batches of substantially equivalent size to improve the quality consistency of the effluent. In another embodiment, the first mixing step comprises opening an air inlet to the tank and drawing air through the inlet by venturi forces to mix with the wastewater. The second mixing step then comprises closing the air inlet to prevent further addition of air.

In another aspect, this invention relates to an improved apparatus for carrying out the method of this invention. The improved apparatus comprises an air inlet to the tank, a valve to open and close the air inlet, and means for moving the valve to alternately open and close the inlet.

In one embodiment, the moving means comprises an electrical timer which controls a solenoid to open and close the air inlet in timed sequence. In another embodiment, the improved apparatus comprises a holding tank for receiving and containing wastewater until a batch is collected. Batches may then be sequentially transferred to the tank for processing, permitting the apparatus to treat the fluctuating loads which often occur with single home or small community processing systems while maintaining the quality consistency of the effluent.

The invention and its practical features will become more apparent from the following detailed description when considered with reference to the accompanying drawings.

DETAILED DESCRIPTION

Figure 1:
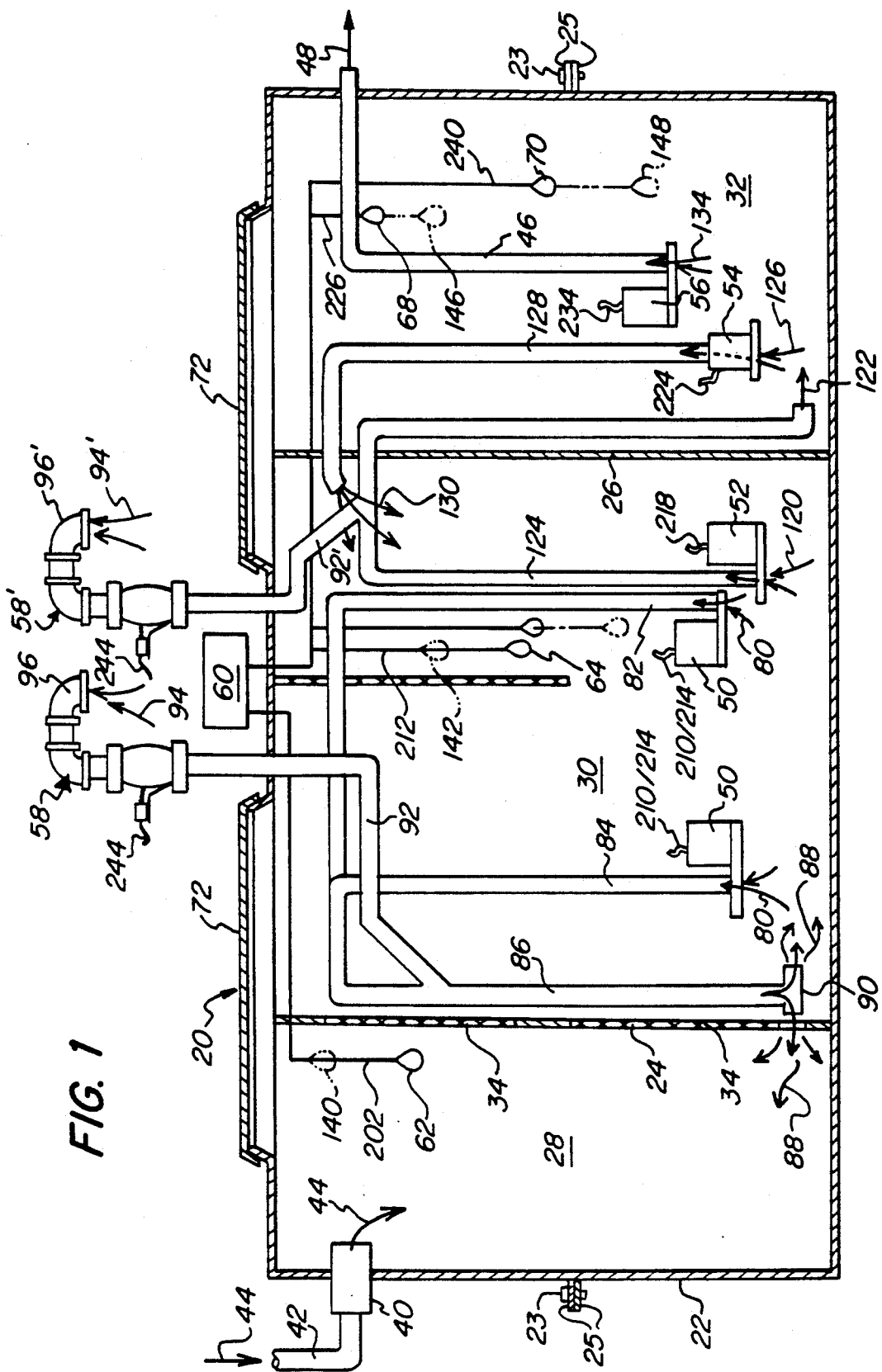
FIG. 1 is a front cross-sectional view of the wastewater processing apparatus of this invention.

FIG. 1 is a front cross-sectional view of a wastewater processing apparatus 20 in accordance with this invention. Wastewater processing apparatus 20 is especially designed for single family or small community use and comprises a tank 22. Tank 22 comprises upper and lower portions joined together with a fiberglass resin compound and a series of bolts 23 at flanges 25 and having screened divider 24 and divider 26. Screened divider 24 separates a comminution section or portion 28 of tank 22 from a mix section or portion 30 of tank 22.

Similarly, divider 26 separates mix section 30 from a settle section or portion 32 of tank 22.

Figure 3:
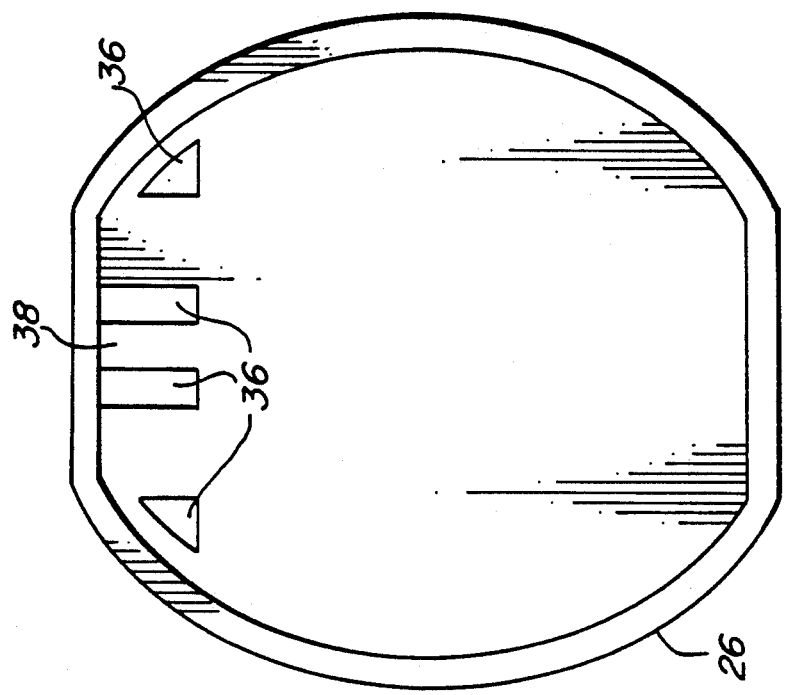
FIG. 3 is a front elevation view of the divider between the mix and settle sections of the apparatus of FIG. 1.
Figure 2:
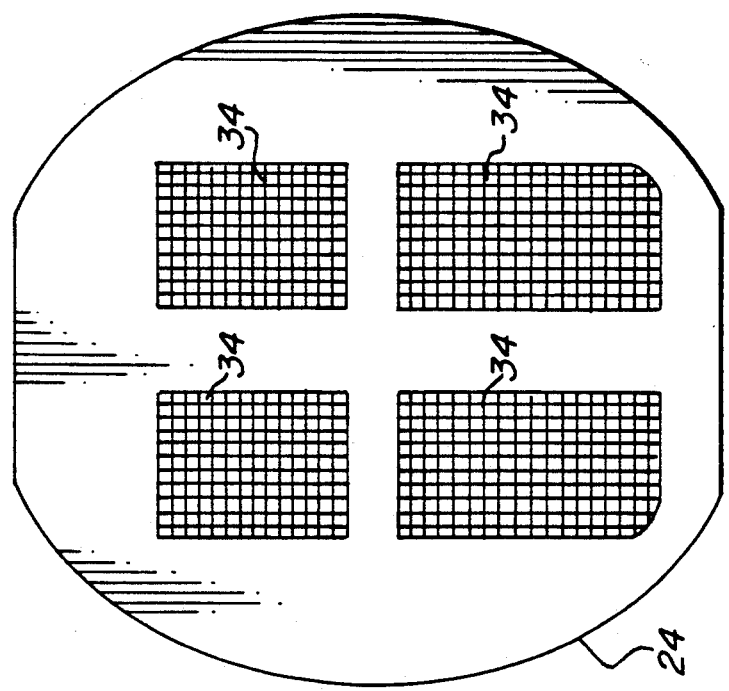
FIG. 2 is a front elevation view of the divider between the comminution and mix sections of the apparatus of FIG. 1.

Referring briefly to FIGS. 2 and 3, front elevation views of dividers 24 and 26 respectively reveal additional detail. Screened divider 24 includes four screen panels 34, but may as easily comprise one or more screen panels. Divider 26 includes four weirs or overflow slots 36 near a top portion 38 thereof. The different constructions of the dividers will become apparent with discussion of the operation of tank 22 below. FIGS. 2 and 3 also illustrate the side or end cross-sectional shape of tank 22 which is preferably formed from fiberglass, plastic or like material.

Referring again to FIG. 1, tank 22 includes a sewage inlet 40 connected to a sewage line 42 for receiving incoming sewage or wastewater to tank 22 as indicated at 44, and an effluent outlet line 46 for removing or discharging outgoing supernatant effluent as indicated at 48. Tank 22 also includes a pair of mixing pumps 50, a transferring or directing pump 52, a returning pump 54, a discharging or removing pump 56, and a pair of aeration devices 58 and 58'. Pumps 50, 52, 54, and 56, and aeration devices 58 and 58' are controlled by a control box 60 which is discussed below with reference to FIG. 10 and a plurality of float switches including:

a high-level alarm float switch 62,
a mix pump high-level float switch 64,
a low water shut off float switch 66,
a return pump shut-off float switch 68, and
a discharge pump shut-off float switch 70.

The pumps may be replaced or other maintenance performed to the inside of tank 22 through removable manhole covers 72.

Figure 5:
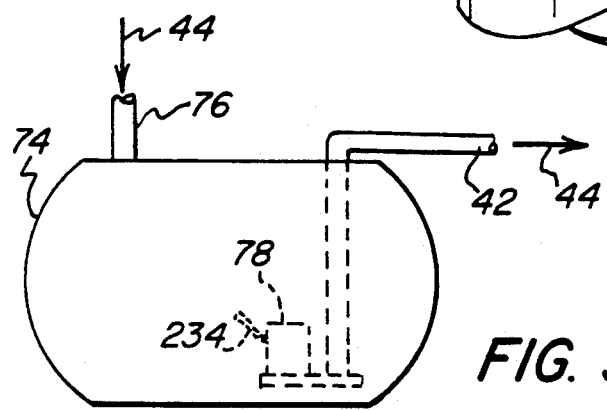
FIG. 5 is a schematic view of a holding tank for providing batches of wastewater to the apparatus of FIG. 1.

In operation, wastewater or sewage is received into comminution section 28 of tank 22 through sewage inlet 40. Although tank 22 may be operated to process a continuous stream of sewage received via sewage line 42, tank 22 may also be operated to process batches of sewage to increase the quality consistency of the effluent. Batch or continuous operation may be programmed into control box 60. Referring briefly to FIG. 5, a holding tank 74 is shown for receiving and containing sewage or wastewater 44 from pipe 76. Batches of sewage may then be transferred via holding tank pump 78, under the control of control box 60 to tank 22 along line 42.

Returning to FIG. 1, solid portions of the received sewage are retained behind screen panels 34 in comminution section 28 while liquid portions flow through to mix section 30 of tank 22. Mixing pumps 50, which may function alternately, pump sewage as indicated at 80 along respective pipes 82 and 84 to a common pipe 86. A relatively turbulent flow of wastewater as indicated at 88 is directed by a T-shaped joint 90 connected to the end of common pipe 86 both into comminute section 28 through screen panel 34 to break up the solid portions of the sewage, and back into mix section 30 to mix up the wastewater.

Sewage in mix section 30 can be mixed either with air or without further addition of air. In this regard, common pipe 86 includes an air inlet pipe 92 connected to aeration device 58 exterior of tank 22. Air enters aeration device 58 as indicated at 94 through an air inlet 96 while preventing rain or other debris from directly entering aeration device 58.

Figure 4:
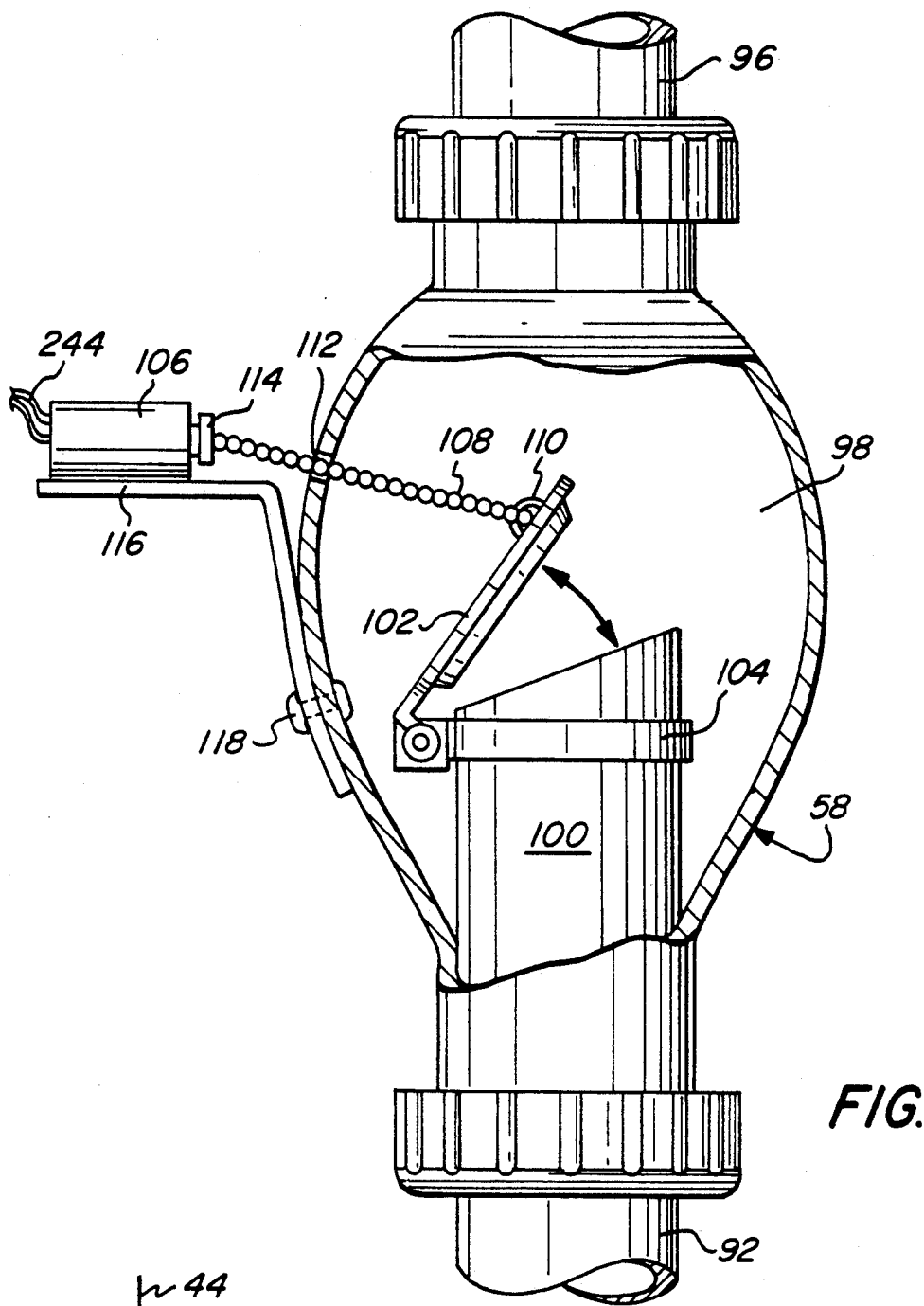
FIG. 4 is a partial side cutaway view of an aeration device for the apparatus of FIG. 1.

Referring now to FIG. 4, a partial side cutaway view of aeration device 58 reveals additional detail. Aeration device 58' is identically constructed. Mounted between air inlet 96 and air inlet pipe 92 is a valve chamber 98. An end portion 100 of air inlet pipe 92 extends into valve chamber 98 and includes a movable cap or valve 102 mounted thereon with a mounting band or the like 104. Valve 102 is movable to open and close air inlet pipe 92 with a solenoid or the like moving means 106 via a chain or the like 108 attached to valve 102 at an eye or hook 110. Chain 108 passes through a hole 112 in valve chamber 98 and is attached to solenoid 106 at 114. Solenoid 106 is supported on a bracket 116 connected at 118 to valve chamber 98. The operation of solenoid 106 to open and close air inlet 96 from common mixing pipe 86 is controlled by control box 60 (see FIG. 1). When valve 102 is open air is drawn through air inlet 96 along air inlet pipe 92 and into common pipe 86 by venturi forces as wastewater flows through common pipe 86 to be mixed in mix section 30.

Returning to FIG. 1, after the sewage is mixed with mixing pumps 50, it is transferred from mix section 30 as indicated at 120 to settle section 32 as indicated at 122 by transferring pump 52 through a transfer pipe 124. Transfer pipe 124 includes an air inlet pipe 92' connected to another aeration device 58' exterior of tank 22 similar to air inlet pipe 92. Also similar are the venturi forces generated as wastewater flows through transfer pipe 124 from mix section 30 to settle section 32. And in like manner, the venturi forces draw air through air inlet 96' as indicated at 94' for combining with the wastewater being transferred to settle section 32.

Once the sewage has been transferred to settle section 32 and suspended solids therein have settled, the settled solids or sludge is returned by return pump 54 as indicated at 126 through a return pipe 128 to mix section 30 again as indicated at 130 for further treatment or processing. After returning the settled solids to mix section 30 and additional settling, discharge pump 56 removes supernatant effluent from the settled sewage at 134 along effluent outlet line 46 and out of tank 22 as indicated at 48. Preferably, two discharge pumps 56 alternate operation to provide duplicity in case of pump failure.

High-level alarm float switch 62 sets off a visual and/or audible alarm when sewage in comminute section 28 rises to a predetermined level 140 indicating the system is backed up. Mix pump high-level float switch 64 turns on both mix pumps 50 when wastewater in mix section 30 rises to a predetermined level 142 to increase processing. Low water shut-off float switch 66 shuts off discharge pump 56 when wastewater in mix section 30 falls to a predetermined level 144 to prevent run-dry damage to the pumps. Return pump shut-off float switch 68 shuts off return pump 54 when wastewater in settle section 32 falls to a predetermined level 146. Finally, discharge pump shut-off float switch 70 shuts off discharge pump 56 when wastewater in settle section 32 falls to a predetermined level 148 below level 146. The shut-off float switches take precedence over the timed sequence of pump operation typically controlled by control box 60 (see FIG. 10).

Figure 6:
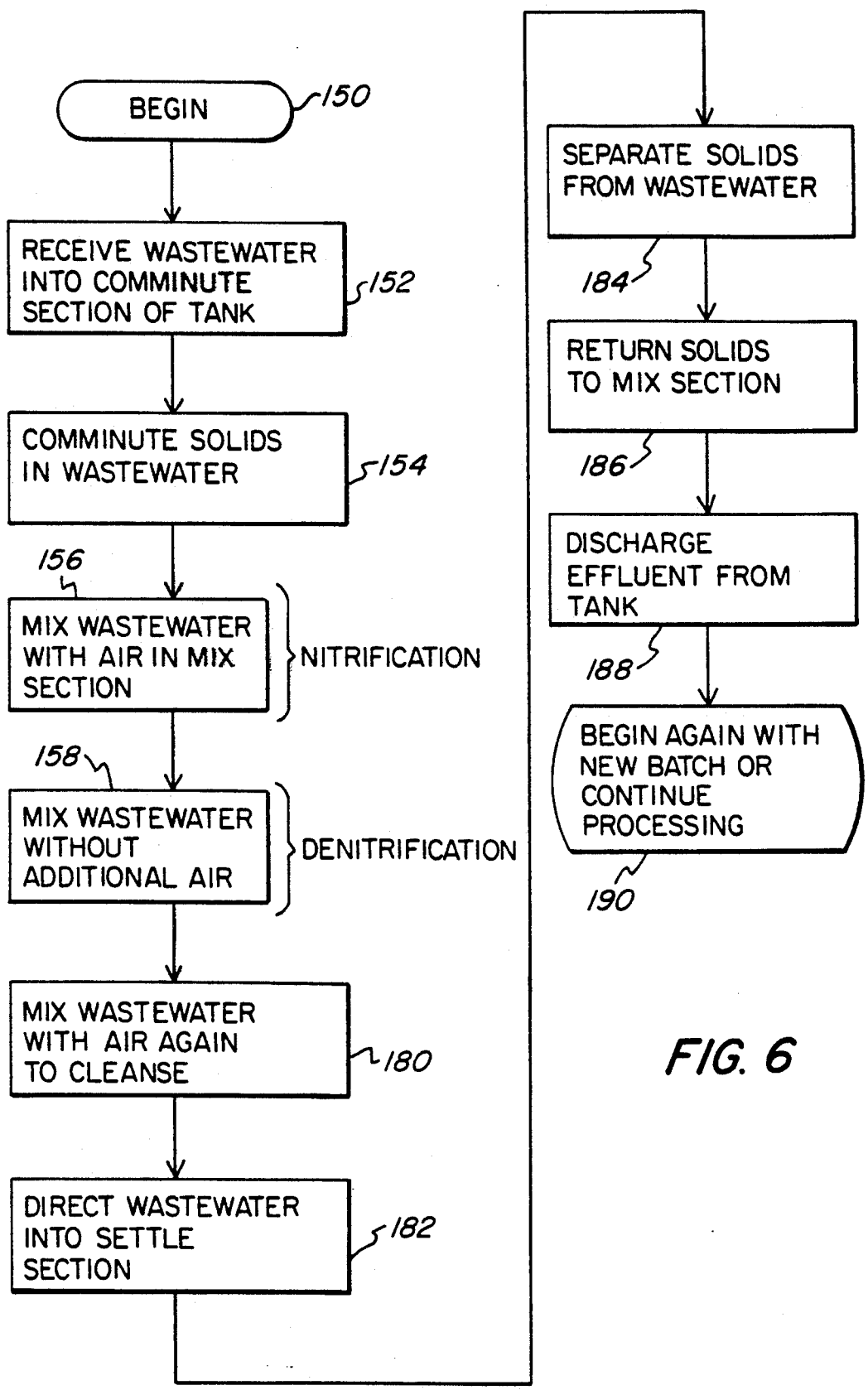
FIG. 6 is a flow diagram illustrating the processing method in accordance with this invention as carried out by the apparatus of FIG. 1.

FIG. 6 is a flow diagram illustrating a method of treating sewage in accordance with this invention as carried out by apparatus 20. The process begins at 150 and tank 22 receives at 152 wastewater into comminute section 28. Solid portions of the received sewage are comminuted at 154, preferably by relatively turbulent flow 88 of mixing wastewater. Once comminuted sewage flows through screen panels 34 of screened divided 24 into mix section 30, the sewage or wastewater is further mixed with air at 156. The step of mixing with air nitrifies the sewage.

Figure 7:
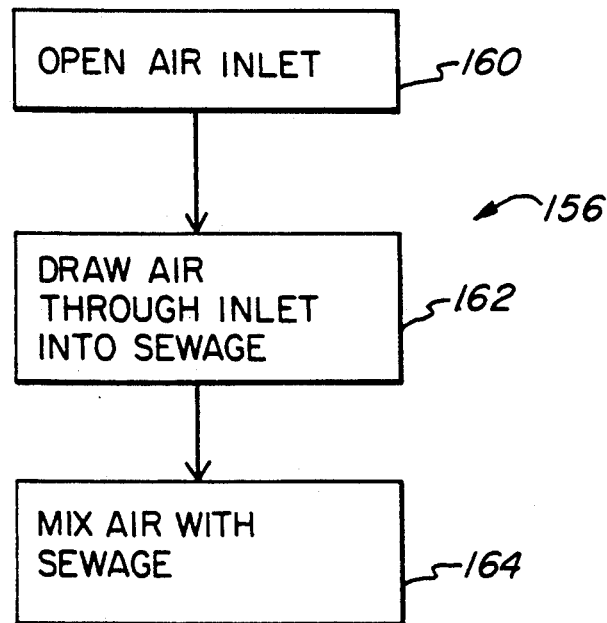
FIG. 7 is a flow diagram illustrating the first mixing step in the method of FIG. 6 in additional detail.

Referring briefly to FIG. 7, the method of nitrifying sewage in apparatus 20 is shown in additional detail. Valve 102 is opened at 160 by control box 60 and solenoid 106 to open air inlet 96 (see FIG. 4). Once opened, air is drawn by venturi forces through air inlet 96, along air inlet pipe 92 and into at 164 the mixing wastewater.

Figure 8:
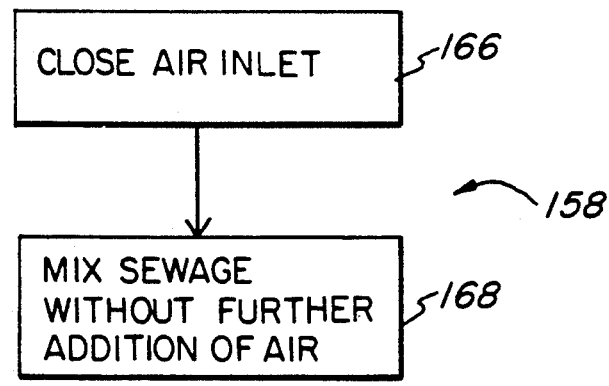
FIG. 8 is a flow diagram illustrating the second mixing step in the method of FIG. 6 in additional detail.

Returning to FIG. 6, after mixing with air at 156, the sewage is mixed at 158 without further addition of air. The step of mixing without further addition of air denitrifies the sewage. Referring briefly to FIG. 8, the method of denitrifying sewage in apparatus 20 is shown in additional detail. Valve 102 is closed at 166 by control box 60 and solenoid 106 to close air inlet 96 (see FIG. 4). Once closed, no additional air is added at 168 to the mixing wastewater.

Figure 9:
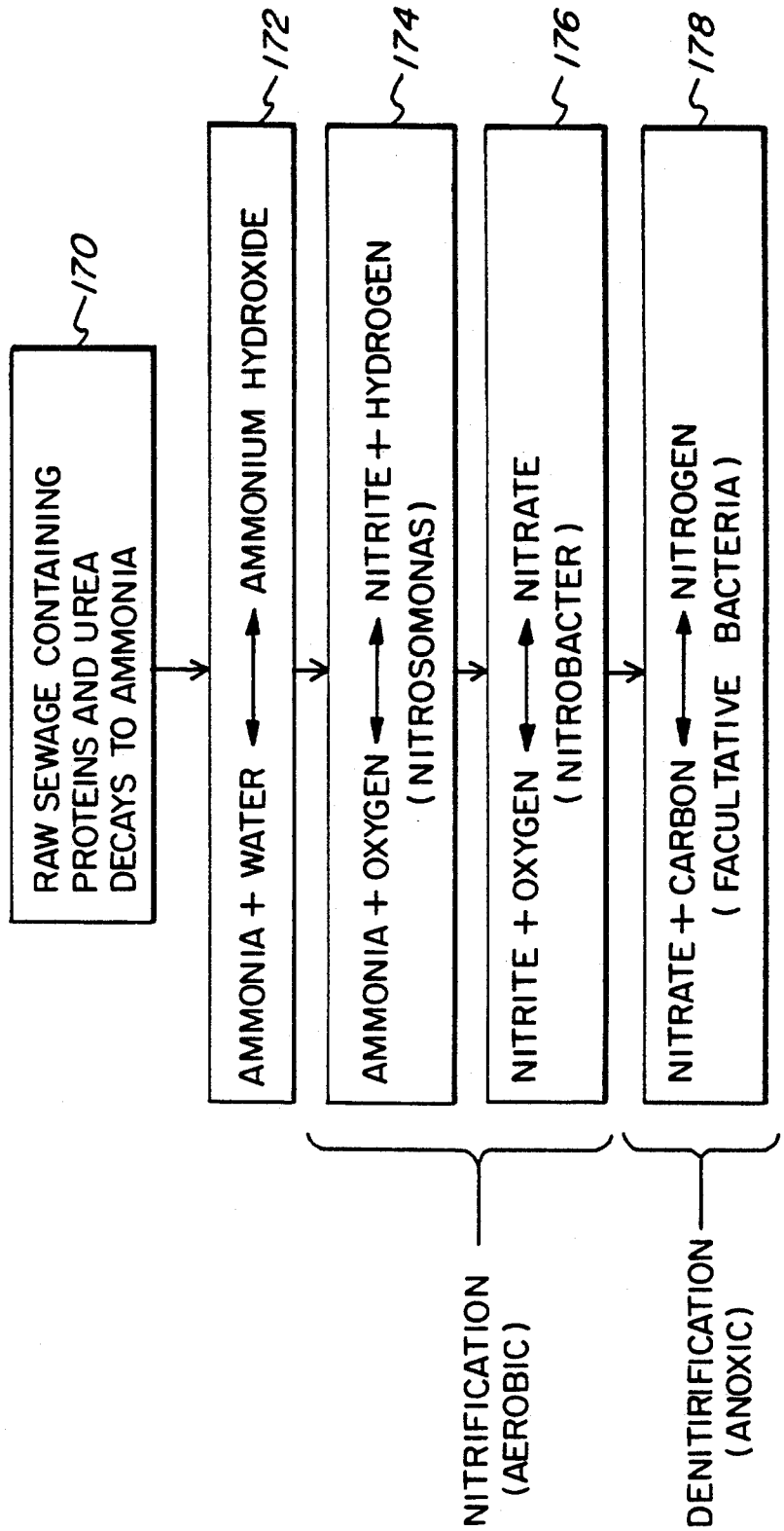
FIG. 9 is a flow diagram illustrating the chemical processing of the sewage when processed by the method of FIGS. 6-8.

FIG. 9 is a flow diagram illustrating the chemical processes which occur when nitrifying and denitrifying the sewage in steps 156 and 158 of FIG. 6. Raw sewage entering tank 22 at 170 contains proteins and urea which decay into ammonia. *Controlling,* p. 13. Ammonia and water equilibrate with ammonium hydroxide at 172. Nitrification occurs in two steps at 174 and 176. First at 174, ammonia and oxygen are consumed by NITROSOMONAS bacteria which produce nitrite and hydrogen. Then, at 176, nitrite and additional oxygen are consumed by NITROBACTER bacteria which produce nitrates. Denitrification occurs at 178 where nitrate and carbon (from the wastewater) are consumed by various facultative bacteria which produce relatively harmless nitrogen gas.

Control box 60 opens valve 102 to permit nitrification or mixing with air for between about 1 hour to about 4 hours sufficient to raise the oxygen concentration in the wastewater to between about 2 mg/l to about 5 mg/l. Control box 60 is also programmed to close valve 102 to permit denitrification or mixing without further addition of air for between about ½ hour to about 2 hours sufficient to lower the oxygen concentration in the wastewater to between about 1 mg/l to about 0 mg/l. Generally, the time ratio of mixing with air to mixing without further addition of air is about 2 to 1.

Returning to FIG. 6, the processing method continues at 180 with mixing the wastewater with air again for between about 10 minutes to about 30 minutes to cleanse any nitrogen therefrom by stripping nitrogen bubbles from bacterial floc. Generally, the time ratio of mixing with air again to mixing without further air to mixing with air is about 1 to 6 to 12. Next, the wastewater is directed or transferred to at 182 to settle section 32. Preferably, wastewater is substantially continuously transferring throughout the mixing steps. Preferably also, the wastewater is being transferred with air, without further air, and with air again by aeration device 58' which functions and is controlled in the same manner for the same time periods as aeration device 58. Wastewater overflows from settle section 32 through weirs 36 (see FIG. 3) and back into mix section 30.

After transferring, wastewater is settled in settle section 32 to separate at 184 settleable solids therein the vast majority of which are bacteria. Next, separated solids or sludge are returned at 186 back into mix section 30 to be reprocessed. Generally between about 10% to about 30% of the wastewater in settle section 32 is returned. Effluent in settle section 32 is then discharged at 188. Generally between about 40% to about 60% of the wastewater in settle section 32 is discharged. Generally also, the wastewater settles for about 1 hour prior to discharge. The 1 hour settle period is preferably divided into two 30 minute periods before and after returning the settled sludge. The second settle period provides a higher quality effluent.

If apparatus 20 is being operated in batch mode, a new batch is received while the prior batch is discharged. Processing of single batch generally requires between about 4 to about 8 hours.

Figure 10:
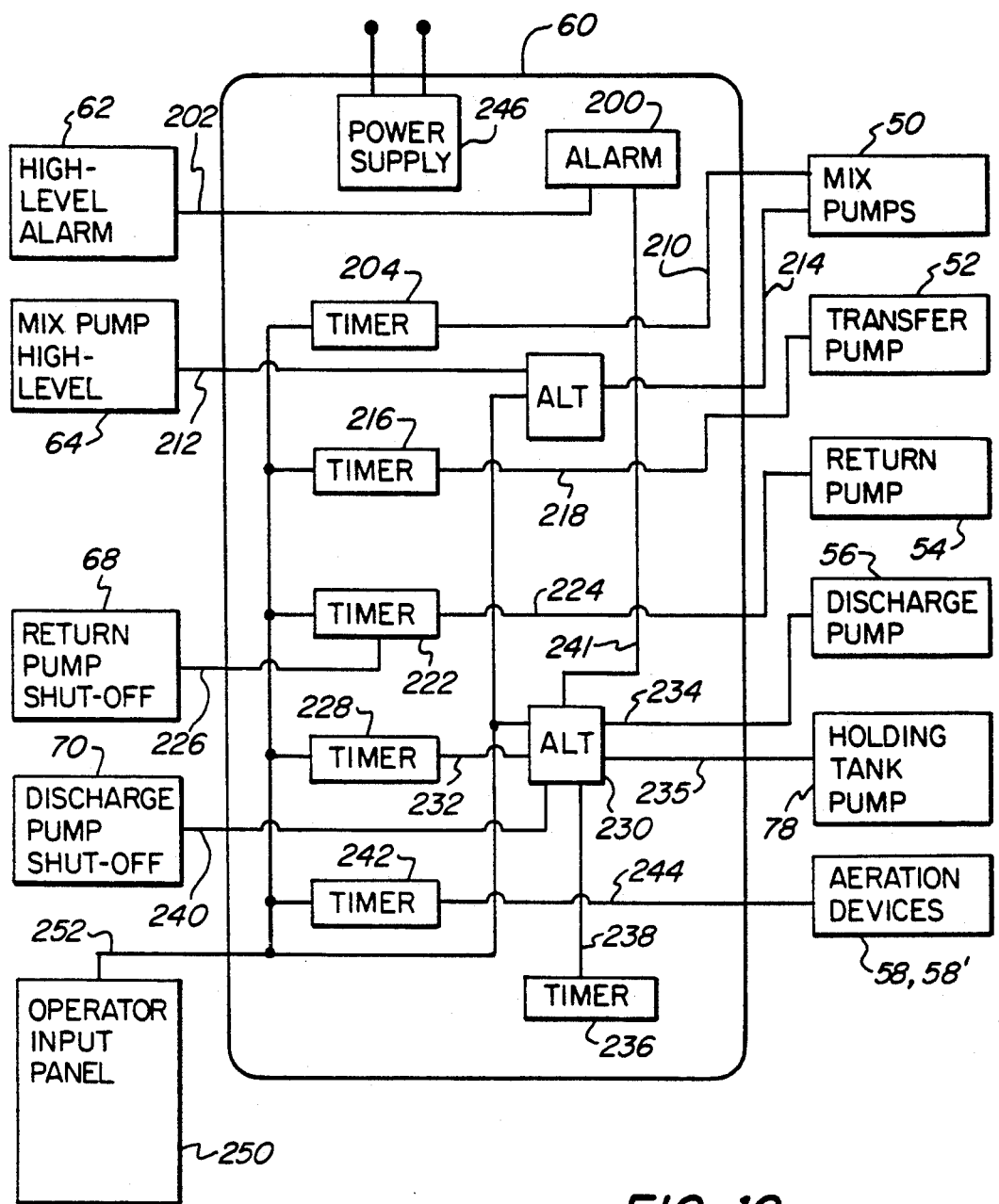
FIG. 10 is a block diagram of the control box for controlling operation of the apparatus of FIG. 1.

FIG. 10 is a block diagram of control box 60. High-level alarm float switch 62 activates an alarm 200 along line 202 when the sewage level in comminute section 28 rises to predetermined level 140. A timer 204 alternately activates mix pumps 50 along line 210. Mix pump high-level float switch 64 may override timer 204, with alternator 208 along line 212 when the wastewater in mix section 30 rises to predetermined level 142, in order to activate both mix pumps 50 along line 214. A timer 216 activates transfer pump 52 along line 218 in a timed sequence. At the end of the mix and transfer cycles, a timer 222 is activated to provide a delay for the settling step of the processing method and then to activate return pump 54 along line 224 in order to return any settled sludge from settle section 32 back into mix section 30. Return pump 54 is turned off by return pump shut-off float switch 68 along line 226. A timer 228 delays for a second portion of the settling step, and then activates alternator 230 along line 232 which in turn activates discharge pump 56 along line 234 to remove the supernatant effluent from tank 22. Preferably, two discharge pumps 56 are provided and in the event one fails to function a timer 236 resets alternator 230 along line 238 to activate the other discharge pump 56. In batch modes of operation, and during discharge, holding tank pump 78 is activated along line 235 to provide a new batch of sewage to tank 22 for treatment. A further input to alternator 230 is provided along line 240 from discharge pump shut-off float switch 70 to turn-off discharge pump 56 when the wastewater in settle section 32 falls to predetermined level 148. Whenever a discharge pump switchover signal is received at alternator 230 along line 238, the alternator activates alarm 200 along line 241 to notify the operator that a discharge pump is malfunctioning. A timer 242 opens and closes the valves in aeration devices 58 and 58' in sequence with the mixing and transferring steps along line 244. A power supply 246 provides power to all the devices within control box 60. Finally, an operator input panel 250 permits an operator to both adjust the timers so that tank 22 provides the highest quality effluent, and to adjust the alternators in order to override the time sequence of operation for special circumstances such as pump failures, routine maintenance, and the like along line 252.

Although the invention has been described with reference to particular embodiments, features, materials of construction and the like, these are not intended to exhaust all possible features, and indeed many other modifications and variations will be ascertainable to those of skill in the art.

What is claimed is:

1. In a wastewater processing apparatus having a mix section for receiving and containing wastewater, means operable within the mix section for mixing the wastewater, a settle section for settling the wastewater to separate any settleable solids, means for transferring the wastewater from the mix section to the settle section, means for returning any settled solids from the settle section back to the mix section, and means for directing supernatant effluent out of the settle section, the improvement comprising:

an air inlet connected with the mixing means for mixing air with the wastewater in the mix section;

a valve to open and close said air inlet; and means for moving said valve to alternately open said air inlet for mixing with air and close said air inlet for mixing without further addition of air to convert any ammonia in the wastewater to nitrogen.

2. The wastewater processing apparatus of claim 1 including a timer for enabling said moving means to move said valve opening said air inlet for between about 1 hour to about 4 hours, and then closing said air inlet for between about ½ hour to about 2 hours.

3. The wastewater processing apparatus of claim 2 wherein said timer also enables said moving means to move said valve opening said air inlet again for between about 15 minutes to about 20 minutes to cleanse the wastewater of trapped nitrogen gas bubbles.

4. The wastewater processing apparatus of claim 1 comprising:

a second air inlet connected with the transferring means for mixing air with the wastewater during transferring from the mix section to the settle section;

a second valve to open and close said second air inlet; and second means for moving said second valve to alternatively open said air inlet for transferring with air and close said air inlet for transferring without further addition of air to convert any ammonia in the wastewater to nitrogen.

5. The wastewater processing apparatus of claim 4 including a timer for enabling said first and second moving means to move said first and second valves opening said first and second air inlets for between about 1 hour to about 4 hours and then closing said first and second air inlets for between about ½ hour to about 2 hours.

6. The wastewater processing apparatus of claim 5 wherein said timer also enables said first and second moving means to move said first and second valves opening said first and second air inlets for between about 15 minutes to about 20 minutes to cleanse the wastewater of trapped nitrogen gas bubbles.

7. The wastewater processing apparatus of claim 1 comprising a holding tank for sequentially delivering batches of wastewater to the mix section to improve the quality consistency of the effluent.

* * * * *